United States Patent
Jacoby et al.

(10) Patent No.: US 9,552,247 B2
(45) Date of Patent: Jan. 24, 2017

(54) METHOD FOR DETECTION OF SOFT MEDIA ERRORS FOR HARD DRIVE

(71) Applicant: Dell Products, LP, Round Rock, TX (US)

(72) Inventors: Robert B. Jacoby, Merrimack, NH (US); Giang L. Nguyen, Lowell, MA (US)

(73) Assignee: Dell Products, LP, Round Rock, TX (US)

( * ) Notice: Subject to any disclaimer, the term of this patent is extended or adjusted under 35 U.S.C. 154(b) by 178 days.

(21) Appl. No.: 14/533,306

(22) Filed: Nov. 5, 2014

(65) Prior Publication Data
US 2016/0124788 A1 May 5, 2016

(51) Int. Cl.
| H03M 13/00 | (2006.01) |
|---|---|
| G06F 11/07 | (2006.01) |
| G06F 11/30 | (2006.01) |
| G06F 11/34 | (2006.01) |

(52) U.S. Cl.
CPC ....... *G06F 11/0772* (2013.01); *G06F 11/0727* (2013.01); *G06F 11/0757* (2013.01); *G06F 11/3034* (2013.01); *G06F 11/3419* (2013.01); *G06F 2201/81* (2013.01)

(58) Field of Classification Search
CPC . G06F 11/079; G06F 11/3034; G06F 11/0772; G06F 11/0727; G06F 11/0751; G06F 11/3419
See application file for complete search history.

(56) References Cited

U.S. PATENT DOCUMENTS

| 7,562,264 B2 | 7/2009 | Tangvald et al. | |
|---|---|---|---|
| 2008/0077825 A1* | 3/2008 | Bello | G06F 11/0727 714/54 |
| 2011/0006818 A1* | 1/2011 | Takagi | H03L 7/085 327/147 |
| 2013/0007258 A1* | 1/2013 | Stern | H04L 12/4641 709/224 |
| 2013/0275800 A1* | 10/2013 | Clemens | H04L 41/0681 714/2 |

OTHER PUBLICATIONS

NN8811196 "Single-Node System Operations Point," IBM Tech Disclosure, Nov 1, 1988; vol. No. 31, Issue No. 6, p. No. 196-201.*
White Paper "EMC CLARiiON RAID 6 Technology," *EMC²*, 14 pages, Jul. 2007.

* cited by examiner

*Primary Examiner* — Guy Lamarre
(74) *Attorney, Agent, or Firm* — Hamilton, Brook, Smith & Reynolds, P.C.

(57) ABSTRACT

Some embodiments are directed to a method, corresponding system, and corresponding apparatus for detecting unexpectedly high latency, due to excessive retries of a given storage device of a set of storage devices. Some embodiments may comprise a processor and associated memory. Some embodiments may monitor one or more completion time characteristics of one or more accesses between the given storage device and one or more host machines. Some embodiments may then compare the one or more completion time characteristics with a given threshold. As a result of the comparison, some embodiments may report, by the one or more host machines, at least one error associated with the given storage device. The error may be unreported by the set of storage devices.

18 Claims, 5 Drawing Sheets

FIG. 2B-I

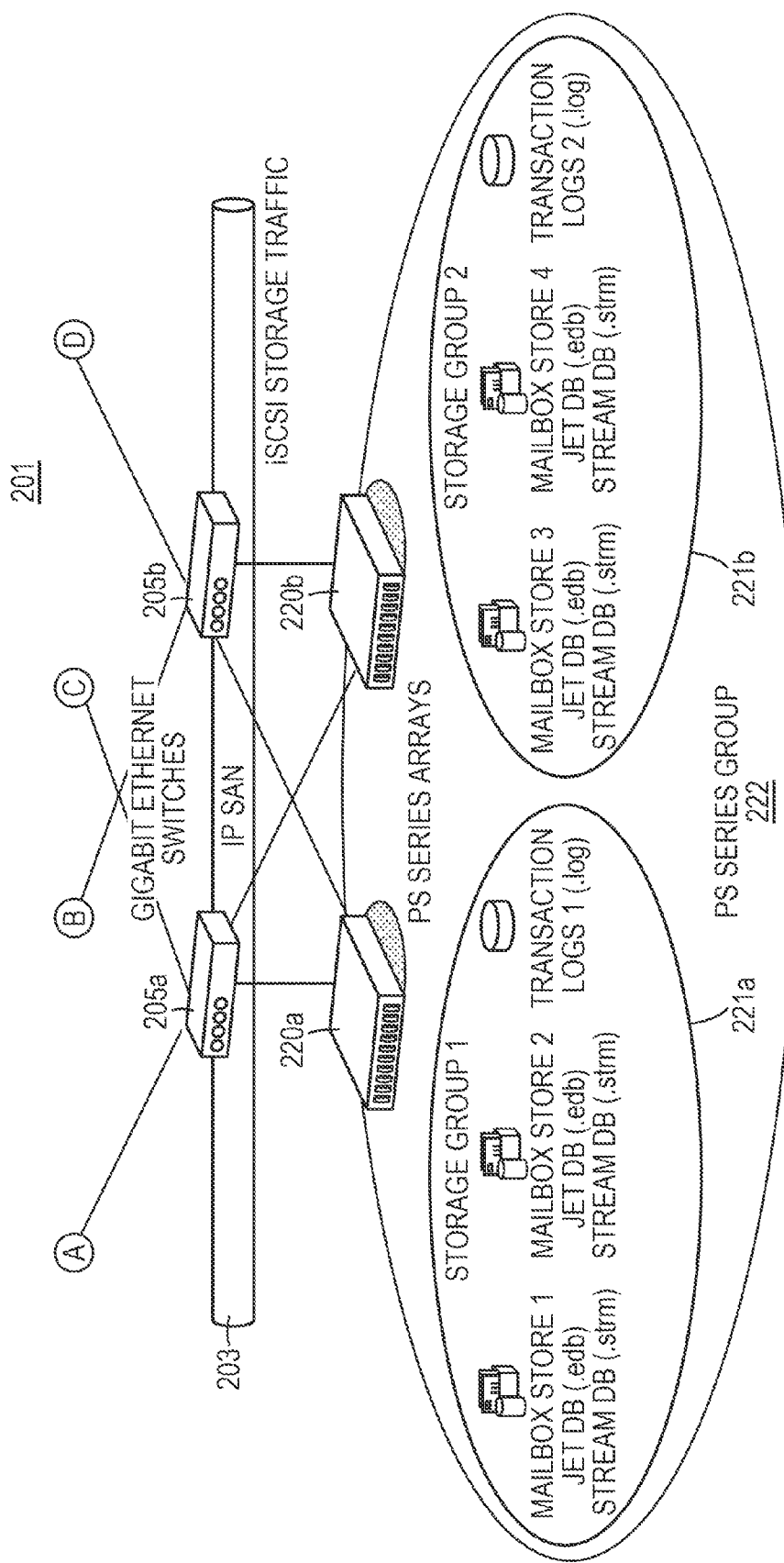
FIG. 2B-II

METHOD FOR DETECTION OF SOFT MEDIA ERRORS FOR HARD DRIVE

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The increased use of technology and computers has generated a corresponding increase in digital data. This ever-increasing digital data requires a corresponding ever-increasing amount of storage space. The need for storage space for digital data has been fueled through many changes in society. For example, home computer users increased storage of multimedia data, especially video and photographic data, has served to increase the amount of storage space needed. Likewise, industry also requires increased storage space. As more and more business is being conducted electronically, there has been an ever-increasing demand and need for the storage of this vast amount of business data. Furthermore, there has been a demand to digitize the storage of once paper files in an attempt to decrease the overhead cost of this paper generation and storage.

With this increase of digital data, there has been a corresponding further reliance upon the integrity and required accessibility of the digital data. While storage device reliability has increased, these devices have not become infallible. One type of error that occurs in digital systems is a soft error (also known as a soft media error). Soft errors may occur when a hard drive fails to complete an input/output (I/O) access on the first pass, but does complete the I/O access after several retries. As used herein, an I/O access may also be referred to as an "I/O" or an "access." As the I/O does complete, no blocks are reallocated, nor is the error reported to the operating system. When an excessive number of soft errors occur, drive performance may degrade significantly, and overall performance may be adversely affected. Such performance degradation may affect a range of products that include (and/or use) storage devices.

Existing approaches describe methods for soft error detection in storage subsystems. For example, U.S. Pat. No. 7,562,264, U.S. patent application Ser. No. 11/516,909 (hereinafter "Tangvald"), and EMC CLARIION RAID 6 TECHNOLOGY (hereinafter "EMC") describe soft error detection in storage subsystems. Existing approaches rely on writing two separate data sets and comparing the data sets to detect transient discrepancies between the data sets.

SUMMARY OF THE DISCLOSURE

In some embodiments, unexpectedly high latency may be detected due to excessive retries. In some embodiments, a computer-implemented method, corresponding system, and corresponding apparatus may detect unexpectedly high latency, due to excessive retries of a given storage device of a set of storage devices. Some embodiments may include a processor and associated memory. Some embodiments may monitor one or more completion time characteristics of one or more accesses between the given storage device and one or more host machines. Some embodiments may then compare the one or more completion time characteristics with a given threshold. As a result of the comparison, some embodiments may report, by the one or more host machines, at least one error associated with the given storage device. The error may be unreported by the set of storage devices.

In some embodiments, the one or more accesses may include one or more retries. In a some embodiments, the given threshold may include at least one of: a time period, a number of accesses between the given storage device and the one or more host machines, and a numerical value. In some embodiments, the one or more completion time characteristics may be associated with a given sample time period. In some embodiments, the one or more completion time characteristics may include at least one of: write latency and read latency.

In some embodiments, the one or more completion time characteristics may include at least one of the following, associated with the one or more accesses: peak latency for the set of storage devices; peak latency for the given storage device; average latency for the given storage device; and ratio of queue drain time between the given storage device and at least one other storage device of the set of storage devices. In some embodiments, the one or more completion time characteristics may include at least three of the following, associated with the one or more accesses: peak latency for the set of storage devices; peak latency for the given storage device; average latency for the given storage device; and ratio of queue drain time between the given storage device and at least one other storage device of the set of storage devices.

In some embodiments, the ratio may be at least one hundred to one. The given storage device may have a highest queue drain time of the set of storage devices. The at least one other storage device may have a second highest queue drain time of the set of storage devices. In some embodiments, the error may include at least one of the following: a soft media error, a high latency error, a excessive retry error, a multiple retry error, and a low amplitude write error.

Some embodiments include an information handling system (IHS). The IHS may include a computing module configured to monitor one or more completion time characteristics of one or more accesses between a given storage device of a set of storage devices and one or more host machines. The computing module may be further configured to compare the one or more completion time characteristics with a given threshold. The IHS may also include a reporting module, configured to report by the one or more host machines, as a result of the comparison, at least one error associated with the given storage device. The error may be unreported by the set of storage devices.

In some embodiments of the IHS, the one or more accesses (including, but not limited to, the monitored accesses) may include one or more retries. In some embodiments of the IHS, the given threshold may include at least one of: a time period, a number of accesses between the given storage device and the one or more host machines, and a numerical value. In some embodiments of the IHS, the one or more completion time characteristics may be associated with a given sample time period.

In some embodiments of the IHS, the one or more completion time characteristics may include at least one of: write latency and read latency. In some embodiments of the IHS, the one or more completion time characteristics may include at least one of the following, associated with the one or more accesses: peak latency for the set of storage devices; peak latency for the given storage device; average latency for the given storage device; and ratio of queue drain time between the given storage device and at least one other storage device of the set of storage devices. In some embodiments of the IHS, the one or more completion time characteristics may include at least three of the following, associated with the one or more accesses: peak latency for the set of storage devices; peak latency for the given storage device; average latency for the given storage device; and ratio of queue drain time between the given storage device and at least one other storage device of the set of storage devices.

In some embodiments of the IHS, the ratio may be at least one hundred to one. The given storage device may have a highest queue drain time of the set of storage devices. The at least one other storage device may have a second highest queue drain time of the set of storage devices. In some embodiments of the IHS, the error may include at least one of the following: a soft media error, a high latency error, an excessive retry error, a multiple retry error, and a low amplitude write error.

Some embodiments are directed to a non-transitory computer readable medium having stored thereon a sequence of instructions which, when loaded and executed by a processor coupled to an apparatus, causes the apparatus to: monitor one or more completion time characteristics of one or more accesses between a given storage device of a set of storage devices and one or more host machines; compare the one or more completion time characteristics with a given threshold; and report by the one or more host machines, as a result of the comparison, at least one error associated with the given storage device, the error being unreported by the set of storage devices.

In some embodiments of the non-transitory computer readable medium, the one or more accesses may include one or more retries. In some embodiments of the non-transitory computer readable medium, the given threshold may include at least one of: a time period, a number of accesses between the given storage device and the one or more host machines, and a numerical value. In some embodiments of the non-transitory computer readable medium, the one or more completion time characteristics may include at least one of the following, associated with the one or more accesses: peak latency for the set of storage devices; peak latency for the given storage device; average latency for the given storage device; and ratio of queue drain time between the given storage device and at least one other storage device of the set of storage devices.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
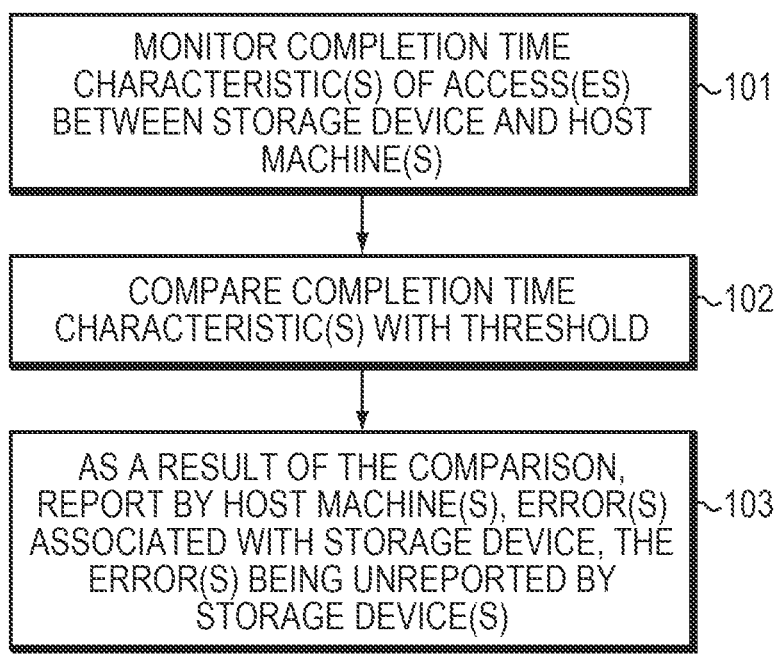
FIG. 1 is a flowchart illustrating detection of unexpectedly high latency due to excessive retries of a given storage device, according to some embodiments.

A description of example embodiments follows.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Soft media errors may occur when a hard drive fails to complete an input/output (I/O) access on the first pass, but does complete the I/O access after several retries. When the I/O access does complete, no blocks are reallocated, nor is the error reported to the operating system. When an excessive number of soft errors occur, drive performance may degrade significantly, and overall performance may be affected. The above-mentioned issues may affect product lines using hard drives, and existing approaches do not provide a process for detecting such issues and preemptively removing a drive. Some embodiments may remedy the above-mentioned deficiencies of existing approaches.

In the case of soft errors, the drive (and/or storage device) may retry the I/O access several times and eventually complete the I/O access. In existing approaches, no error may be reported back to the miniport driver, but the I/O access may take a significant amount of time to process. Tracking the time to completion for a given I/O access may be helpful, but may be insufficient in itself as some transactions may be expected to take a longer time (e.g., write transactions may be delayed during a parity rebuild). Advantageously, embodiments disclosed herein may remedy at least the above-mentioned deficiencies.

In some embodiments, a method for detecting soft errors may include monitoring the length of completion for one or more I/O accesses, monitoring overall read latency for the disk subsystem, and comparing disk queue drain ratios against other drives in the same redundant array of inexpensive disks (RAID) set. Soft errors are a known industry issue. Soft errors may affect performance in a small percentage of cases. When soft errors affect performance, there may be no direct evidence that soft errors are a cause of the performance issues, as there may be no drive errors. Therefore, soft errors may be difficult to diagnose in existing approaches. By contrast, embodiments may preemptively diagnose soft errors. Soft errors diagnosed by embodiments may include, but are not limited to, soft errors that have unexpectedly high latency and are unreported by storage devices. Soft errors may include, but are not limited to, low amplitude write and/or read errors, and/or multiple retry errors. As such, some embodiments may remedy the deficiencies of existing approaches.

Some embodiments are directed to a method for detecting soft errors that affect performance. In some embodiments, a soft error is defined as an error that is not reported back to the operating system. The error may be transient (e.g., intermittent) in nature, unlike a typical hard error. Some embodiments may use overall read latency and/or disk queue drain ratios in order to arrive at a prediction of a soft error. A novel feature as compared to existing approaches, is that some embodiments may use "read latency" and/or "disk queue drain ratios" to arrive at the detection of a soft error.

Furthermore, the "soft errors" (and/or "soft media errors") described in existing approaches are substantially different from the "soft errors" detected by some embodiments. Some embodiments may detect "soft errors." In some embodiments, the detection of "soft errors" may include detection of unexpectedly high latency, due to excessive retries of a given storage device of a set of storage devices. In some embodiments, "soft errors" may be reported by the one or more host machines. In some embodiments, the "soft error" may be unreported by the set of storage devices. In great contrast, the "soft errors" described in existing approaches are actual bad blocks (really hard media errors). As such, the "soft errors" of existing approaches are substantially different from the "soft errors" described with respect to embodiments disclosed herein.

FIG. 1 illustrates an embodiment of an efficient and reliable method (and system) 100 for detecting unexpectedly high latency due to excessive retries of a given storage device of a set of storage devices. Some embodiments may monitor one or more completion time characteristics of one or more accesses between the given storage device and one or more host machines 101. Some embodiments may then compare the one or more completion time characteristics with a given threshold 102. As a result of the comparison, some embodiments may report, by the one or more host machines, at least one error associated with the given storage device 103. The error may be unreported by the set of storage devices.

In some embodiments, one or more accesses may include one or more retries. The given threshold may include at least one of: a time period, a number of accesses between the given storage device and the one or more host machines, and a numerical value. In some embodiments, the one or more completion time characteristics may be associated with a given sample time period. The one or more completion time characteristics may include at least one of: write latency and read latency, where latency may include, but is not limited to, drive latency over time.

In some embodiments, the one or more completion time characteristics may include at least one of the following, associated with the one or more accesses: peak latency for the set of storage devices; peak latency for the given storage device; average latency for the given storage device; and ratio of queue drain time between the given storage device and at least one other storage device of the set of storage devices. In some embodiments, the one or more completion time characteristics may include at least three of the following, associated with the one or more accesses: peak latency for the set of storage devices; peak latency for the given storage device; average latency for the given storage device; and ratio of queue drain time between the given storage device and at least one other storage device of the set of storage devices.

In some embodiments, the ratio may be at least one hundred to one. The given storage device may have a highest queue drain time of the set of storage devices. The at least one other storage device may have a second highest queue drain time of the set of storage devices. In some embodiments, the error may include at least one of the following: a soft media error, a high latency error, a excessive retry error, a multiple retry error, and a low amplitude write error.

Some embodiments may detect hot spots in groups of disks, e.g., individual disks where the number of I/O retries is excessive. For example, some embodiments may include a group of disks. For example, seven disks may have queue drain times of 5, 80, 110, 87,010, 5, 400, and 321, respectively. In such an example, the highest queue drain time of 87,010 is compared against the second highest queue drain time of 400, and the ratio of the highest queue drain time to the second highest queue drain time is found to be above one hundred to one (e.g., the highest queue drain time may be greater than 40,000=400*100).

In some embodiments, a soft error may be detected. Detection of a soft error may include, but is not limited to, detection of high latency due to excessive retries, where such an error is not reported by the storage device. As such, an advantage is that it enables a user to determine whether a hot spot (e.g., including, but not limited to, an overused disk) is merely due to an excessive number of accesses, or due to a given bad disk. In some embodiments, in addition, the user may optionally swap the disk with highest queue drain time with the disk with second highest queue drain time, to further determine whether a given disk is at fault.

In some embodiments, one or more of the following four test criteria may be used to detect soft errors. The four test criteria may include completion time characteristics, including but not limited to queue drain amounts, average read latency, drives reporting I/O accesses, and cache meter read waits, as compared with threshold values including but not limited to, time values and/or numerical values.

First, a calculated ratio of drives with the highest versus the second highest queue drains (e.g., the time it takes to clear a given drive's I/O queue) during sample period may be used to detect soft errors. Second, an average read latency greater than a 40 millisecond (ms) time threshold during a sample period may be used to detect soft errors. Third, a highest drive reporting I/O accesses taking longer than a 10 second time threshold during sample period may be used to detect soft errors. In some embodiments, the highest drive may be one drive out of a group of drives. In some embodiments, the time taking longer may be a peak read latency. Fourth, cache meter read waits exceeding a time threshold of 10 seconds during sample period may be used to detect soft errors.

In some embodiments, cache meter read waits may be used to detect soft errors, including cache meter read wait information for each (and/or all) of the drives out of a group of drives. In some embodiments, the time threshold may be compared against the read latency peak of the cache meter read waits. In some embodiments, the sample size may include any individual read and/or write that took more than 10 seconds to access one or more disks. In an alternative embodiment, more or less than four of the above-mentioned test criteria may be used to detect soft errors. Although the time threshold values of 40 milliseconds and 10 seconds may be used above, embodiments are not so limited.

Figure 2A:
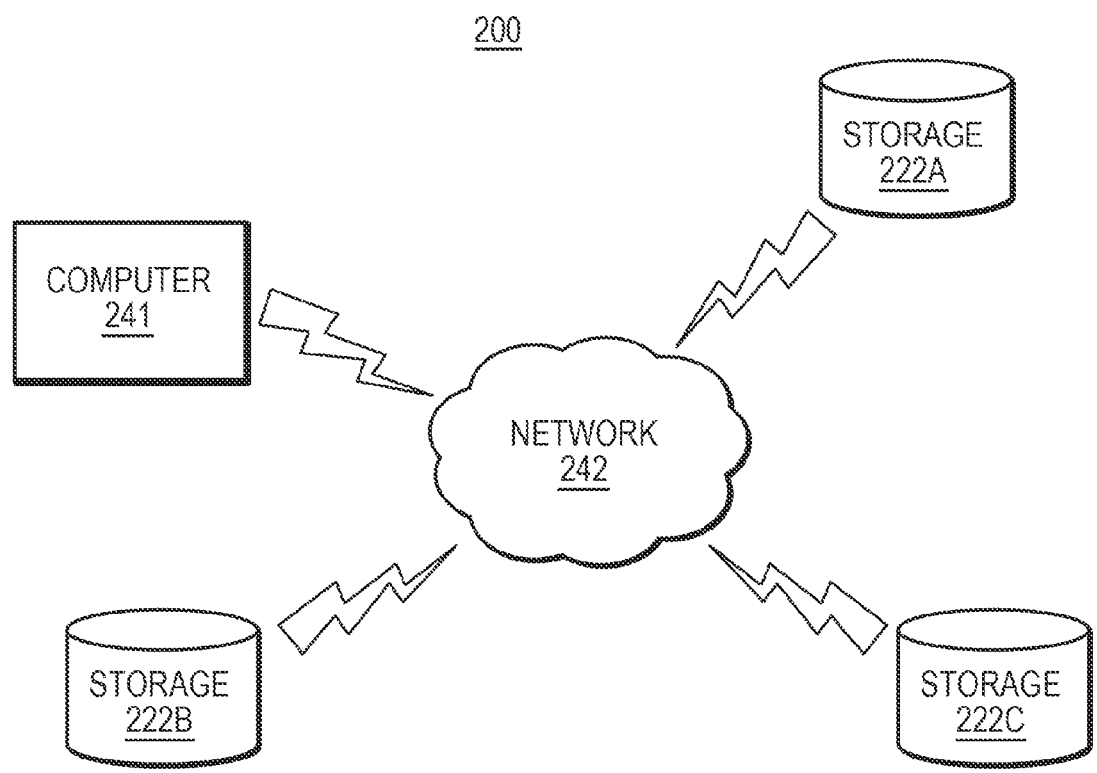
FIG. 2A is a schematic view of a computer network environment in which some embodiments may be implemented.

FIG. 2A illustrates a computer network environment 200 in which some embodiments may be implemented. The computer 241 and the sets 222A, 222B, 222C of one or more storage devices (each one of the sets 222A, 222B, 222C representing one or more storage devices) are linked through network 242. The computer 241 and the sets 222A, 222B, 222C of one or more storage devices may be connected through any network as is known in the art, including a storage area network (SAN), a wide area network (WAN) or local area network (LAN). The computer 241 may embody an information handling system (IHS) 320 (referring to FIG. 3 to follow) and/or any embodiment of the IHS described herein. Similarly, the computer 241 may be configured to detect soft errors, including detecting unexpectedly high latency due to excessive retries of a storage device, where the error may be unreported by one or more sets of storage devices 222A, 222B, 222C. According to some embodiments, a host computer 241 (and/or NAS server) may be configured to detect soft errors across the network 242 associated with one or more sets 222A, 222B, 222C of storage devices. While three sets 222A, 222B, 222C of storage devices are depicted, the computer network environment 200 may comprise any number of storage devices.

Figure 2B:
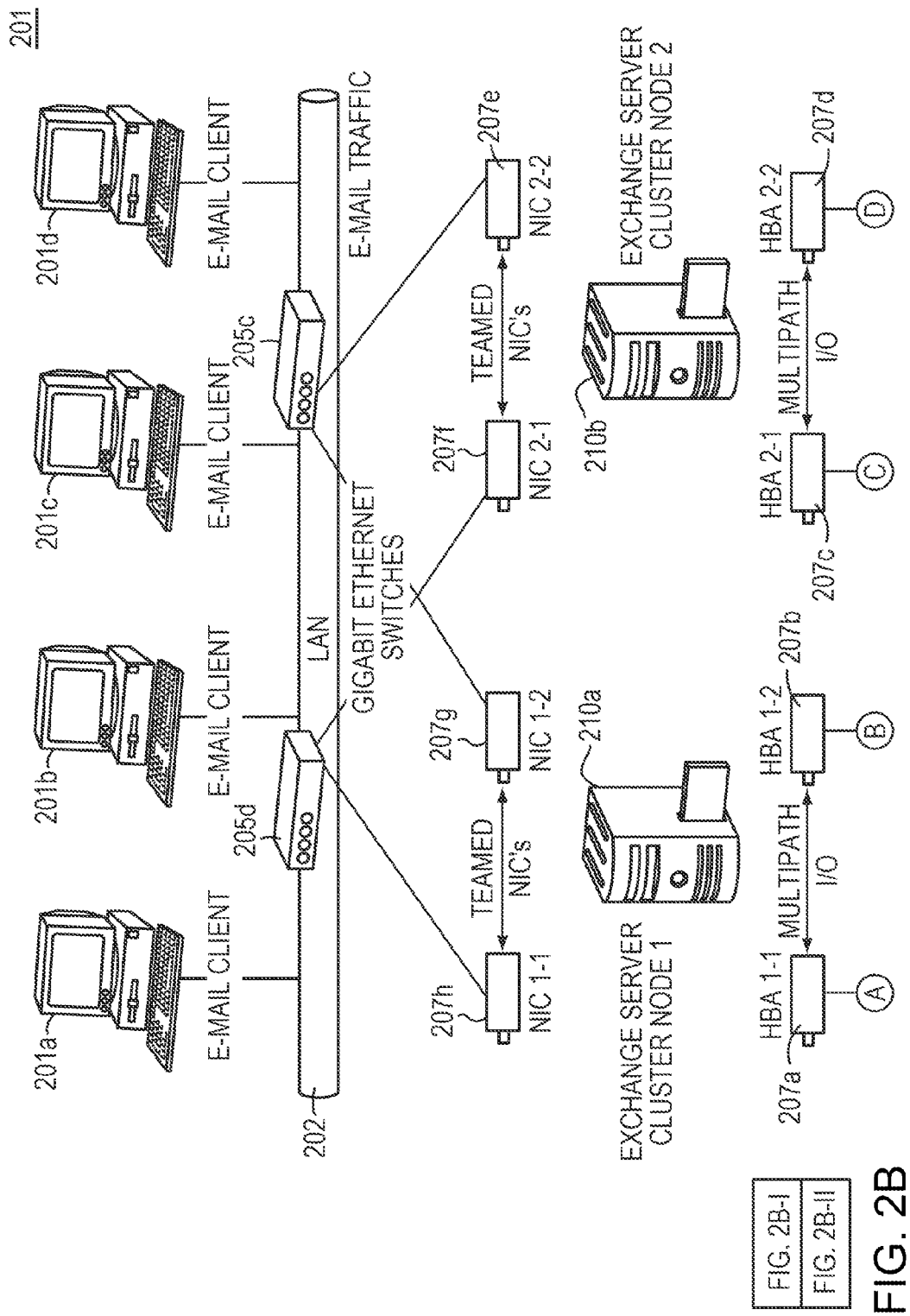
FIG. 2B (FIGS. 2B-I and 2B-II) is a block diagram view of another computer network environment in which some embodiments may be implemented.

As illustrated in FIG. 2B (FIGS. 2B-I and 2B-II), some embodiments may run on a network 201 that may include, but is not limited to, a storage area network (SAN) 203 and a local area network (LAN) 202. The LAN 202 may include components such as one or more clients 201a, 201b, 201c, 201d that communicate through one or more network switches 205c, 205d to one or more network interface cards (NICs) 207e, 207f, 207g, 207h to one or more servers 210a, 210b. The SAN 203 may include, but is not limited to, an Internet Protocol (IP) SAN. The SAN 203 may include components such as one or more servers 210a, 210b that communicate to one or more network switches 205a, 205b through a set of one or more network interface cards (NICs) 207a, 207b, 207c, 207d. Network switches 205a, 205b of the storage area network 203 may communicate to Peer Storage (PS) series arrays 220a, 220b across the SAN 203. Therefore, the SAN 203 may include components such as a PS series group 222 that may include, but is not limited to, storage groups 221a, 221b and PS series data arrays 220a, 220b. The PS series group 222 may include a given set (referring to each of 222A, 222B, and 222C of FIG. 2A) of storage devices. In some embodiments, the SAN 203 may be considered to include the LAN 202 and the above-mentioned components with which the LAN 202 communicates, in addition to the above-mentioned components with which the SAN 203 communicates.

Figure 3:
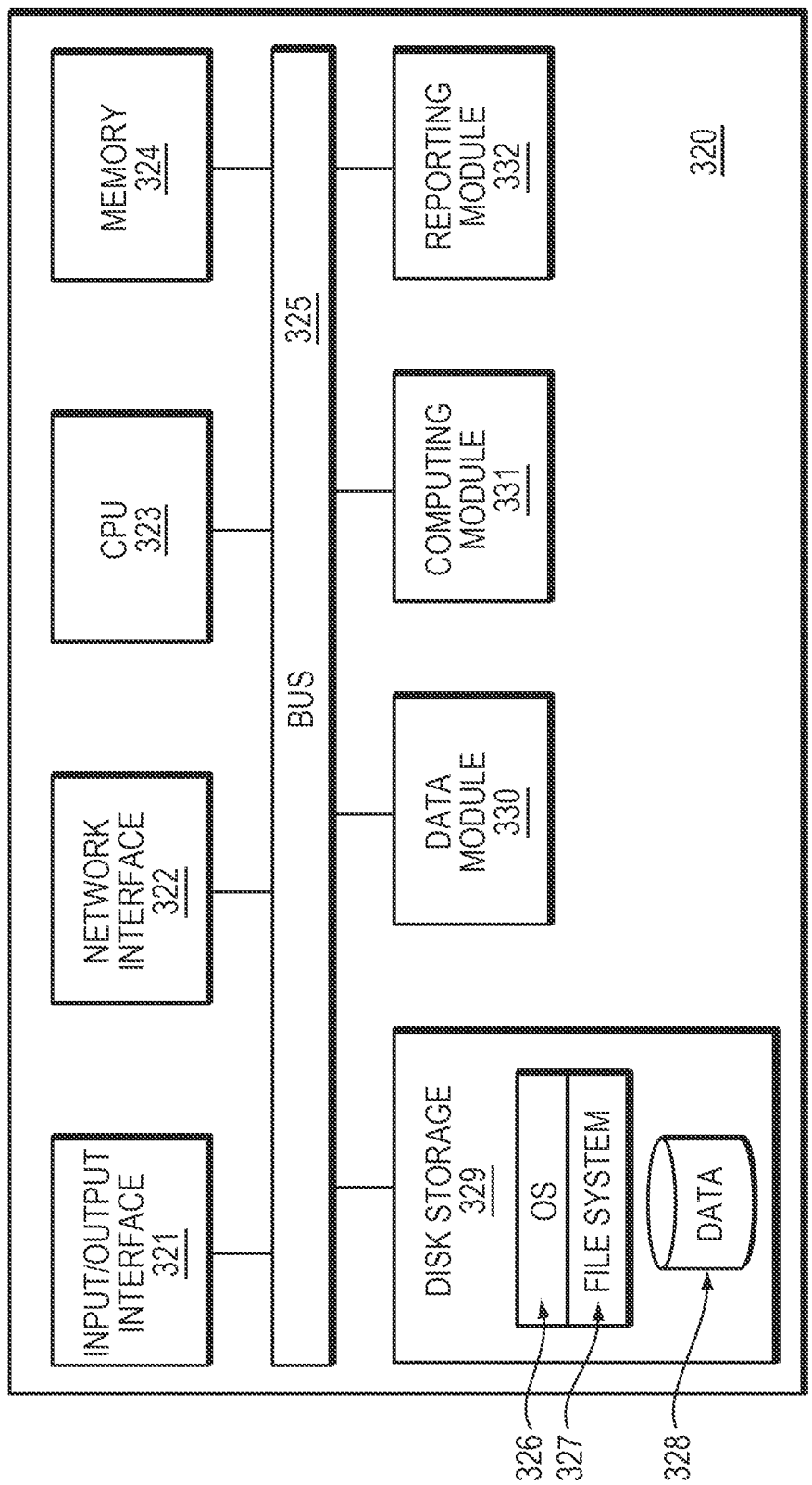
FIG. 3 is a simplified block diagram of an information handling system (IHS) in some embodiments.

FIG. 3 is a high level block diagram of an information handling system (IHS) 320 that may be configured to detect soft errors in a storage area network according to some embodiments, including detecting unexpectedly high latency due to excessive retries of a storage device, where the error may be unreported by a set of storage devices. The IHS 320 comprises a bus 325. The bus 325 is a connection between the various components of the IHS 320. Connected to the bus 325 is an input/output interface 321 for connecting various input and output devices, such as a keyboard, mouse, display, speakers, etc. to the IHS 320. Further connected to the bus 325 is a network interface 322 for connecting the IHS 320 to the various networks that are known in the art. A Central Processing Unit (CPU) 323 is connected to the bus 325 and provides for the execution of computer instructions. Memory 324 provides volatile storage for data used for carrying out computer instructions. Disk storage 329 provides non-volatile storage for software instructions such as the operating system (OS) 326 and the data 328. Communicatively coupled with the OS 326 is the file system 327. Disk storage 329 may be any storage device known in the art.

The IHS 320 comprises a computing module 331 that may include a first set of one or more storage devices 329. According to some embodiments of the IHS 320, the computing module 331 may be configured to monitor one or more completion time characteristics of one or more accesses between a given storage device of a set of storage devices and one or more host machines through the input/output interface 321 or the network 322 via a bus 325. The computing module 331 may be further configured to compare the one or more completion time characteristics with a given threshold.

The IHS 320 may also include a reporting module 332, configured to report by the one or more host machines, as a result of the comparison, at least one error associated with the given storage device. The error may be unreported by the set of storage devices. The IHS 320 may also comprise a data module 330 which may be configured to read and/or write data in conjunction with the computing module 331 and/or the reporting module 332. In some embodiments, the reporting module 332 may be configured to present results of the comparison to a user. The data module 330 and/or computing module 331 and/or reporting module 332 may be communicatively coupled to each other as illustrated in FIG. 3.

In some embodiments, the data module 330 may be further configured to retrieve and/or update data stored in disk storage 329 to perform the above-mentioned functions. For example, the data module 330 may copy data to and/or from the storage device 329 or via the input/output interface 321 or network interface 322. The data module 330 may copy data to and/or from any communicatively coupled source, including, but not limited to, the computing module 331, the reporting module 332, the network 322, the input/output interface 321, the memory 324, or disk storage 329.

In some embodiments of the IHS 320, the computing module 331 may monitor one or more accesses including one or more retries. In some embodiments of the IHS 320, the given threshold that the computing module 331 uses for comparison may include at least one of: a time period, a number of accesses between the given storage device and the one or more host machines, and a numerical value. Some embodiments of the IHS 320 may monitor one or more completion time characteristics that may be associated with a given sample time period.

Some embodiments of the IHS 320 may monitor one or more completion time characteristics that may include at least one of: write latency and read latency. Some embodiments of the IHS 320 may monitor one or more completion time characteristics that may include at least one of the following, associated with the one or more accesses: peak latency for the set of storage devices; peak latency for the given storage device; average latency for the given storage device; and ratio of queue drain time between the given storage device and at least one other storage device of the set of storage devices. Some embodiments of the IHS 320 may monitor one or more completion time characteristics that may include at least three of the following, associated with the one or more accesses: peak latency for the set of storage devices; peak latency for the given storage device; average latency for the given storage device; and ratio of queue drain time between the given storage device and at least one other storage device of the set of storage devices.

In some embodiments of the IHS 320, the above-mentioned ratio may be at least one hundred to one. The given storage device may have a highest queue drain time of the set of storage devices. The at least one other storage device may have a second highest queue drain time of the set of storage devices. In some embodiments of the IHS 320, the error may include at least one of the following: soft media error, high latency error, excessive retry error, multiple retry error, and low amplitude write error.

While the various components of the IHS 320 are illustrated in FIG. 3, embodiments of the IHS 320 are not so limited, and as is known in the art, components and modules of the IHS 320 may be connected in a variety of ways, including embodiments wherein one or more components are remotely located. It should be understood by a person of ordinary skill in the art that the IHS 320 may be implemented in various forms. The respective components and modules of the IHS 320 may be combined in any manner that is known in the art and may be implemented in any combination of hardware and software. For example, the above-described components and modules may be executable instructions in memory 324 or Operating System (OS) 326 operated on by CPU 323. Further, the IHS 320 and its various components and modules may be configured to operate in a manner corresponding to the above described method 100, described herein above in relation to FIG. 1 and its various embodiments.

It should be understood that the example embodiments described above may be implemented in many different ways. In some embodiments, the various methods and machines described herein may be implemented by a physical, virtual or hybrid general-purpose computer, or a computer network environment such as the computer network environments 200, 201. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, some embodiments may also be implemented in a variety of computer architectures, physical, virtual, cloud computers, and/or some combination thereof, and, thus, the data processors described herein are intended for purposes of illustration only and not as a limitation of the embodiments.

While this disclosure has been particularly shown and described with references to example embodiments thereof, it will be understood by those skilled in the art that various changes in form and details may be made therein without departing from the scope of the embodiments encompassed by the appended claims. In some embodiments, a storage device may be considered to be a drive and/or disk. A soft error may be considered to be a soft media error.

What is claimed is:

1. A computer-implemented method for detecting unexpectedly high latency due to excessive retries, the computer-implemented method comprising, by a processor and associated memory:
    monitoring, by one or more host machines external to a storage area network (SAN), one or more completion time characteristics of one or more accesses between a given storage device of a set of storage devices of the storage area network (SAN) and the one or more host machines, the one or more accesses including one or more retries, the one or more completion time characteristics including at least one of:
    write latency and read latency;
    comparing, by the one or more host machines, the one or more completion time characteristics with a given threshold; and
    as a result of the comparison, detecting and reporting, by the one or more host machines, at least one soft error associated with the given storage device, prior to detection of or reporting of the soft error by the storage area network (SAN).

2. The computer-implemented method of claim 1, wherein the given threshold includes at least one of: a time period, a number of accesses between the given storage device and the one or more host machines, and a numerical value.

3. The computer-implemented method of claim 1, wherein the one or more completion time characteristics is associated with a given sample time period.

4. The computer-implemented method of claim 1, wherein the one or more completion time characteristics include a ratio of queue drain time between the given storage device and at least one other storage device of the set of storage devices and zero or more of the following, associated with the one or more accesses:
    peak latency for the set of storage devices;
    peak latency for the given storage device; and
    average latency for the given storage device.

5. The computer-implemented method of claim 4, wherein the ratio is at least one hundred to one, the given storage device has a highest queue drain time of the set of storage devices, and the at least one other storage device has a second highest queue drain time of the set of storage devices.

6. The computer-implemented method of claim 1, wherein the soft error includes at least one of the following: soft media error, high latency error, excessive retry error, multiple retry error, and low amplitude write error.

7. The computer-implemented method of claim 1, wherein the one or more completion time characteristics include peak latency for the set of storage devices and zero or more of the following, associated with the one or more accesses:
  peak latency for the given storage device;
  average latency for the given storage device; and
  ratio of queue drain time between the given storage device and at least one other storage device of the set of storage devices.

8. The computer-implemented method of claim 1, wherein the one or more completion time characteristics include peak latency for the given storage device and zero or more of the following, associated with the one or more accesses:
  peak latency for the set of storage devices;
  average latency for the given storage device; and
  ratio of queue drain time between the given storage device and at least one other storage device of the set of storage devices.

9. The computer-implemented method of claim 1, wherein the one or more completion time characteristics include average latency for the given storage device and zero or more of the following, associated with the one or more accesses:
  peak latency for the set of storage devices;
  peak latency for the given storage device; and
  ratio of queue drain time between the given storage device and at least one other storage device of the set of storage devices.

10. An information handling system (IHS) comprising:
  a computing module configured to monitor, by one or more host machines external to a storage area network (SAN), one or more completion time characteristics of one or more accesses between a given storage device of a set of storage devices of the storage area network (SAN) and the one or more host machines, the one or more accesses including one or more retries, the one or more completion time characteristics including at least one of: write latency and read latency;
  the computing module further configured to compare, by the one or more host machines, the one or more completion time characteristics with a given threshold; and
  a reporting module, configured to detect and report by the one or more host machines, as a result of the comparison, at least one soft error associated with the given storage device, prior to detection of or reporting of the soft error by the storage area network (SAN).

11. The IHS of claim 10, wherein the given threshold includes at least one of: a time period, a number of accesses between the given storage device and the one or more host machines, and a numerical value.

12. The IHS of claim 10, wherein the one or more completion time characteristics is associated with a given sample time period.

13. The IHS of claim 10, wherein the one or more completion time characteristics include a ratio of queue drain time between the given storage device and at least one other storage device of the set of storage devices and zero or more of the following, associated with the one or more accesses:
  peak latency for the set of storage devices;
  peak latency for the given storage device; and
  average latency for the given storage device.

14. The IHS of claim 13, wherein the ratio is at least one hundred to one, the given storage device has a highest queue drain time of the set of storage devices, and the at least one other storage device has a second highest queue drain time of the set of storage devices.

15. The IHS of claim 10, wherein the soft error includes at least one of the following: soft media error, high latency error, excessive retry error, multiple retry error, and low amplitude write error.

16. A non-transitory computer readable medium having stored thereon a sequence of instructions which, when loaded and executed by a processor coupled to an apparatus, causes the apparatus to:
  monitor, by one or more host machines external to a storage area network (SAN), one or more completion time characteristics of one or more accesses between a given storage device of a set of storage devices of the storage area network (SAN) and the one or more host machines, the one or more accesses including one or more retries, the one or more completion time characteristics including at least one of: write latency and read latency;
  compare, by the one or more host machines, the one or more completion time characteristics with a given threshold; and
  detect and report by the one or more host machines, as a result of the comparison, at least one soft error associated with the given storage device, prior to detection of or reporting of the soft error by the storage area network (SAN).

17. The non-transitory computer readable medium of claim 16, wherein the given threshold includes at least one of: a time period, a number of accesses between the given storage device and the one or more host machines, and a numerical value.

18. The non-transitory computer readable medium of claim 16, wherein the one or more completion time characteristics include a ratio of queue drain time between the given storage device and at least one other storage device of the set of storage devices and zero or more of the following, associated with the one or more accesses:
  peak latency for the set of storage devices;
  peak latency for the given storage device; and
  average latency for the given storage device.

* * * * *